US012141705B2

(12) United States Patent
Abelha Ferreira et al.

(10) Patent No.: US 12,141,705 B2
(45) Date of Patent: Nov. 12, 2024

(54) DECODING RANDOM FOREST PROBLEM SOLVING THROUGH NODE LABELING AND SUBTREE DISTRIBUTIONS

(71) Applicant: EMC IP Holding Company LLC, Hopkinton, MA (US)

(72) Inventors: Paulo Abelha Ferreira, Rio de Janeiro (BR); Jonas Furtado Dias, Beecroft (AU); Adriana Bechara Prado, Niterói (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1018 days.

(21) Appl. No.: 17/107,782

(22) Filed: Nov. 30, 2020

(65) Prior Publication Data

US 2022/0172075 A1     Jun. 2, 2022

(51) Int. Cl.
| | |
|---|---|
| *G06N 5/01* | (2023.01) |
| *G06F 18/20* | (2023.01) |
| *G06F 18/214* | (2023.01) |
| *G06F 18/22* | (2023.01) |
| *G06F 18/231* | (2023.01) |
| *G06F 18/24* | (2023.01) |
| *G06N 20/20* | (2019.01) |

(52) U.S. Cl.
CPC ........... *G06N 5/01* (2023.01); *G06F 18/2155* (2023.01); *G06F 18/22* (2023.01); *G06F 18/231* (2023.01); *G06F 18/24* (2023.01); *G06F 18/29* (2023.01); *G06N 20/20* (2019.01)

(58) Field of Classification Search
CPC ...... G06N 5/01; G06N 20/20; G06F 18/2155; G06F 18/22; G06F 18/231; G06F 18/24; G06F 18/29; G06V 10/7625
See application file for complete search history.

(56) References Cited

U.S. PATENT DOCUMENTS

2019/0325335 A1* 10/2019 Chan ..................... G06N 20/20
2022/0254461 A1* 8/2022 Vaughan ................. G06N 5/01

OTHER PUBLICATIONS

Flouri, T. et al., "An optimal algorithm for computing all subtree repeats in trees", Philosophical Transactions of the Royal Society, Germany, 2014 (13 pages).
Leo Breiman, "Random Forests", Statistics Department, University of California, Berkeley, CA, 2001 (28 pages).

* cited by examiner

*Primary Examiner* — Sanchita Roy
(74) *Attorney, Agent, or Firm* — Chamberlain, Hrdlicka, White, Williams & Aughtry; Aly Z. Dossa

(57) ABSTRACT

Decoding random forest problem solving through node labeling and subtree distributions. Random forests, like any other type of machine learning algorithm, are designed and configured to solve classification, regression, and/or prediction problems. Solutions (or outputs) provided by random forests, given inputs in the form of values for a set of features, may sometimes be inaccurate, unexpected, or undesirable. Understanding or decoding how a random forest solves a given problem may be a way to correct or improve the random forest. The disclosed method, accordingly, proposes decoding random forest problem solving through the identification of subtrees (by way of node labeling) amongst a random forest, as well as the frequencies that these subtrees appear (or distributions thereof) throughout the random forest.

14 Claims, 12 Drawing Sheets

DECODING RANDOM FOREST PROBLEM SOLVING THROUGH NODE LABELING AND SUBTREE DISTRIBUTIONS

BACKGROUND

Solutions (or outputs) provided by random forests, given inputs in the form of values for a set of features, may sometimes be inaccurate, unexpected, or undesirable. Understanding or decoding how a random forest solves a given problem may be a way to correct or improve the random forest.

SUMMARY

In general, in one aspect, the invention relates to a method for decoding random forest models. The method includes obtaining a random forest model including a set of unlabeled nodes, labeling the set of unlabeled nodes using a tree node labeling algorithm, to produce a labeled random forest model, applying, to the labeled random forest model, an adapted subtree matching algorithm to construct a feature multi-level map, traversing the feature multi-level map to obtain a sorted feature repeat list and a set of root height for feature repeat distribution lists, identifying a significant feature of the random forest model using at least one of a group consisting of the sorted feature repeat list and the set of root height for feature repeats distribution lists, and improving the random forest model at least based on the significant feature.

In general, in one aspect, the invention relates to a non-transitory computer readable medium (CRM). The non-transitory CRM includes computer readable program code, which when executed by a computer processor, enables the computer processor to obtain a random forest model including a set of unlabeled nodes, label the set of unlabeled nodes using a tree node labeling algorithm, to produce a labeled random forest model, apply, to the labeled random forest model, an adapted subtree matching algorithm to construct a feature multi-level map, traverse the feature multi-level map to obtain a sorted feature repeat list and a set of root height for feature repeat distribution lists, identify a significant feature of the random forest model using at least one of a group consisting of the sorted feature repeat list and the set of root height for feature repeats distribution lists, and improve the random forest model at least based on the significant feature.

Other aspects of the invention will be apparent from the following description and the appended claims.

DETAILED DESCRIPTION

Figure 1:
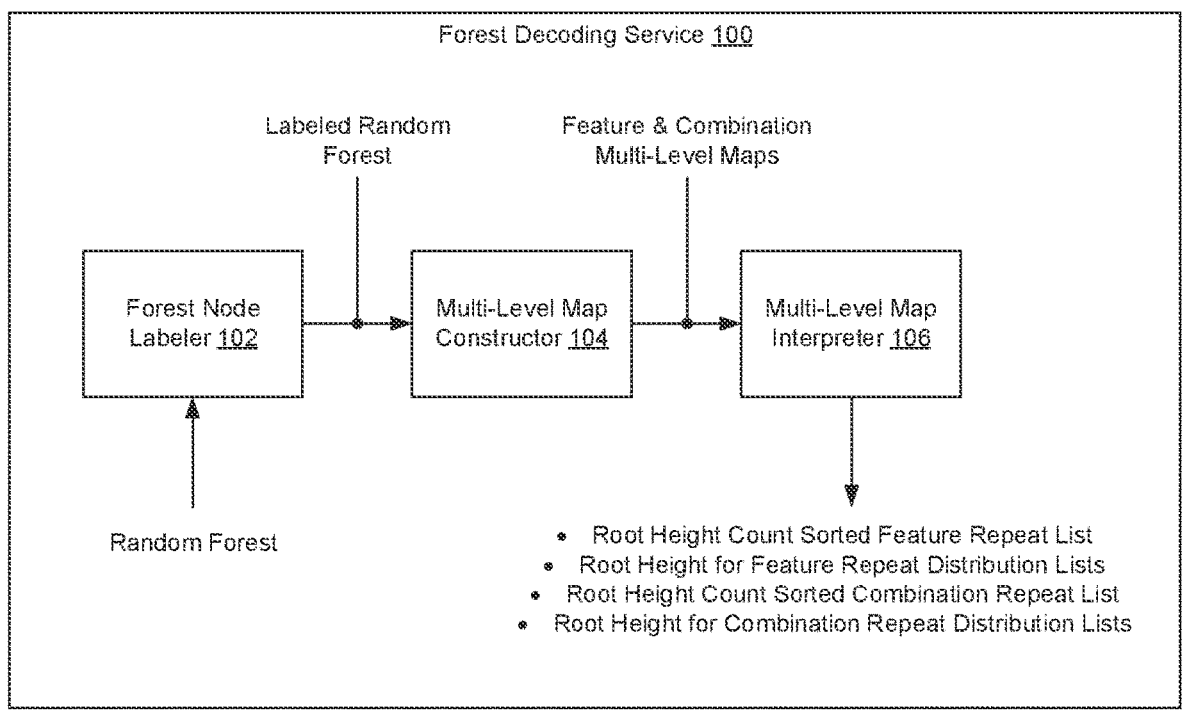
FIG. 1 shows a forest decoding service in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to decoding random forest problem solving through node labeling and subtree distributions. Random forests, like any other type of machine learning algorithm, are designed and configured to solve classification, regression, and/or prediction problems. Solutions (or outputs) provided by random forests, given inputs in the form of values for a set of features, may sometimes be inaccurate, unexpected, or undesirable. Understanding or decoding how a random forest solves a given problem may be a way to correct or improve the random forest. The disclosed method, accordingly, proposes decoding random forest problem solving through the identification of subtrees (by way of node labeling) amongst a random forest, as well as the frequencies that these subtrees appear (or distributions thereof) throughout the random forest.

FIG. 1 shows a forest decoding service in accordance with one or more embodiments of the invention. The forest decoding service (100) may represent information technology (IT) infrastructure designed and configured for random forest problem solving decoding, which may pertain to understanding how random forest models produce solutions to classification or prediction problems. To that extent, the forest decoding service (100) may include functionality to perform the methods described in FIGS. 5-7B, below. Further, the forest decoding service (100) may be implemented using one or more servers (not shown). Each server may represent a physical or virtual server, which may reside in a datacenter or a cloud computing environment. Alternatively, or additionally, the forest decoding service (100) may be implemented using one or more computing systems similar to the exemplary computing system shown in FIG. 8. Furthermore, the forest decoding service (100) may include a forest node labeler (102), a multi-level map constructor (104), and a multi-level map interpreter (106). Each of these forest decoding service (100) components is described below.

In one embodiment of the invention, the forest node labeler (102) may refer to a computer program that may execute on the underlying hardware of the forest decoding service (100), which may be responsible for labeling random forest nodes. To that extent, the forest node labeler (102) may include functionality to: obtain a random forest model (see e.g., FIG. 2A) for processing; label the nodes of the obtained random forest model using step node labeling (see e.g., FIG. 6) or clustered node labeling (see e.g., FIGS. 7A and 7B), thereby producing a labeled random forest model; and provide the labeled random forest model to the multi-level map constructor (104) for processing. One of ordinary skill will appreciate that the forest node labeler (102) may perform other functionalities without departing from the scope of the invention.

In one embodiment of the invention, step node labeling may refer to a tree node labeling algorithm (or an algorithm configured to label unlabeled nodes of a decision tree or a random forest), which centers around threshold steps for unique features (described below) (see e.g., FIGS. 2A and 2B) exhibited in a random forest model. A threshold step may refer to a class resolution (or class interval size) for defining any class in a distribution of feature values. In using a threshold step, nodes that are similar, according to the class resolution associated with a given feature, may be aggregated under a common node label—i.e., nodes that are the same number of threshold steps (for a given feature) away from an absolute minimum feature value (for the given feature) may be labeled using the same node label.

In one embodiment of the invention, clustered node labeling may refer to a tree node labeling algorithm, which centers around maximum threshold steps for node clusters (or groups of similar node subsets) in a random forest model. A maximum threshold step may refer to a maximum allowed distance (or difference) between a cluster feature value representative of a cluster of nodes and a feature value for a feature posed by any given node in the random forest model. In using a maximum threshold step, nodes that are similar, according to the cluster to which the nodes may be assigned, may be labeled using a common node label.

In one embodiment of the invention, the multi-level map constructor (104) may refer to a computer program that may execute on the underlying hardware of the forest decoding service (100), which may be responsible for constructing multi-level maps (i.e., nested arrays). To that extent, the multi-level map constructor (104) may include functionality to: obtain a labeled random forest model from the forest node labeler (102); apply an adapted subtree matching algorithm to the labeled random forest model to construct a feature multi-level map and/or a combination multi-level map (see e.g., FIGS. 3A and 3B); and provide the constructed feature and/or combination multi-level map(s) to the multi-level map interpreter (106) for processing. One of ordinary skill will appreciate that the multi-level map constructor (104) may perform other functionalities without departing from the scope of the invention.

In one embodiment of the invention, the above-mentioned adapted subtree matching algorithm may refer to a modified version of a forward (or non-overlapping) stage of an existing algorithm[1] for identifying all subtree repeats in a random forest model (or any constituent decision tree thereof). Adaptation of the aforementioned existing algorithm entailed allowing the existing algorithm to build, as well as track subtree repeats within, the above-mentioned feature and/or combination multi-level map(s) while maintaining the linear efficiency of the original algorithm A subtree may be defined as any smaller tree structure found within a larger tree structure. Further, a given subtree may encompass a single node (also referred to herein as a feature subtree) or multiple nodes (i.e., a hierarchy of nodes) (also referred to herein as a combination subtree).

[1]Flouri, T., Kobert, K., Pissis, S. P. and Stamatakis, A., 2014. *An optimal algorithm for computing all subtree repeats in trees*. Philosophical Transactions of the Royal Society A: Mathematical, Physical and Engineering Sciences, 372(2016), p. 20130140.

In one embodiment of the invention, the multi-level map interpreter (106) may refer to a computer program that may execute on the underlying hardware of the forest decoding service (100), which may be responsible for interpreting multi-level maps (i.e., nested arrays). To that extent, the multi-level map interpreter (106) may include functionality to: obtain feature and/or combination multi-level map(s) from the multi-level map constructor (104); interpret (i.e., traverse) the feature multi-level map to obtain a root height count sorted feature repeat list and various root height for feature repeat distribution lists (i.e., one distribution list for each unique feature disclosed in the random forest model); interpret (i.e., traverse) the combination multi-level map to obtain a root height count sorted combination repeat list and various root height for combination repeat distribution lists (i.e., one distribution list for each unique combination disclosed in the random forest model); and present the aforementioned lists to an administrator, so that an action concerning the random forest model (e.g., identifying one or more significant features and/or combinations, to improve the random forest model) may be performed. One of ordinary skill will appreciate that the multi-level map interpreter (106) may perform other functionalities without departing from the scope of the invention.

While FIG. 1 shows a configuration of components, other forest decoding service (100) configurations may be used without departing from the scope of the invention.

Figure 2A:
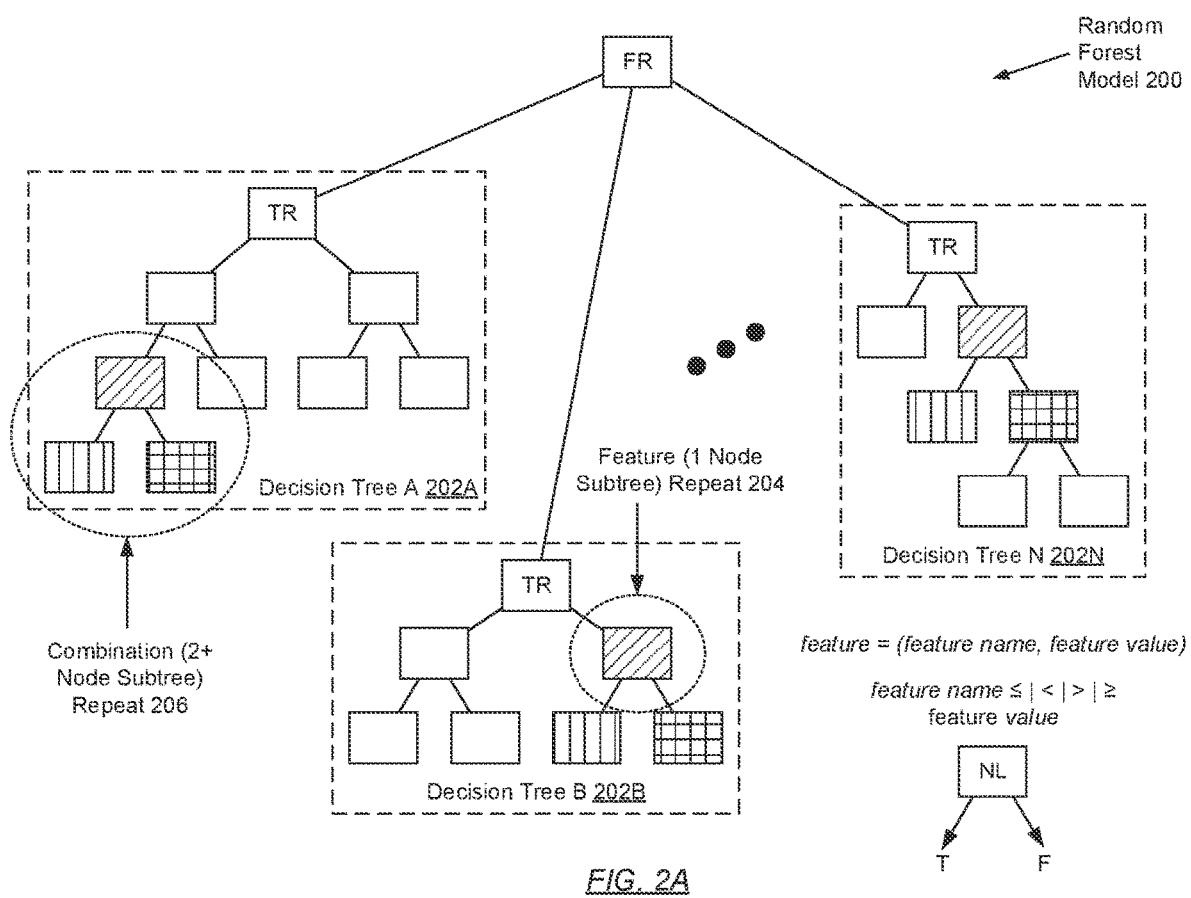
FIG. 2A shows a random forest model in accordance with one or more embodiments of the invention.

FIG. 2A shows a random forest model in accordance with one or more embodiments of the invention. A random forest model (200) (also referred to herein as a random forest) may represent a type of machine learning (or artificial intelligence) algorithm Like various other types (e.g., neural networks, support vector machines, etc.) of machine learning (or artificial intelligence) algorithms, a random forest model (200) may be designed, configured, and optimized to address certain problems, such as data classification, regression, and/or prediction problems.

In one embodiment of the invention, a random forest model (200) may refer to an ensemble (or collection) of decision trees (202A-202N). Each decision tree (202A-202N) may be generalized as a rooted, ordered, and unlabeled binary tree, or a tree data structure in which each node has either zero or two children and is unlabeled. Nodes that have zero children may be referred to as leaf nodes, whereas nodes that have two children may be referred to as non-leaf (NL) nodes. Within a decision tree (202A-202N), each non-leaf node may pose a yes-no (or true-false) question entailing a feature, from which two paths—i.e., a "yes" or "true" path and a "no" or "false" path—may stem. Further, each of these two paths may either lead to another non-leaf node posing another yes-no (or true-false) question entailing a different feature, or a leaf node revealing a decision tree (202A-202N) output (e.g., a classification or a prediction). Accordingly, each decision tree (202A-202N) in a random forest model (200) may encompass a set of yes-no (or true-false) questions, through which some input (defined by values for a set of features representative of a data sample) traverses, until an output (given the input) is reached. The final output of a random forest model (200) may then be an aggregation of the outputs of the collection of decision trees (202A-202N), such as which output had resulted (for a given input) from a majority of the constituent decision trees (202A-202N) forming the random forest model (200).

In one embodiment of the invention, a feature may refer to a parameter pertinent to the classification, regression, or prediction problem that may be addressed by a random forest model (200). Any feature, associated with a non-leaf node of any decision tree (202A-202N), may be associated with a feature name, and may or may not be associated with a feature value. The feature name of a given feature may refer to a string of arbitrary characters (or symbols) that uniquely identifies the given feature. Meanwhile, the feature value (if any) of a given feature may refer to a quantitative (e.g., numerical) or qualitative (e.g., categorical, ordinal, text, etc.) value reflective of the given feature. Furthermore, features having an association with a respective feature value may be posed in yes-no (or true-false) questions in non-leaf nodes of a decision tree (202A-202N) that may include an equality operator (e.g., equal to (=) or not equal to (≠)) or an inequality operator (e.g., greater than (>), less than (<), greater than or equal to (≥), or less than or equal to (≤)) relating the feature name to the feature value of the features.

In one embodiment of the invention, each decision tree (202A-202N) may have a tree root (TR), which may refer to the topmost node of the decision tree (202A-202N). A random forest model (200) may also have a root (i.e., a forest root (FR)), which sits above (and thus directly connects to) the tree root of each constituent decision tree (202A-202N). Moreover, throughout a random forest model (200), repeats of one or more subtrees (i.e., smaller trees within a decision tree (202A-202N)) may be exhibited. A repeated subtree may encompass a single node (also referred to as a feature subtree) (204) or a hierarchy of multiple nodes (also referred to as a combination subtree) (206).

While FIG. 2A shows a configuration of components, other random forest model (200) configurations may be used without departing from the scope of the invention.

Figure 2B:
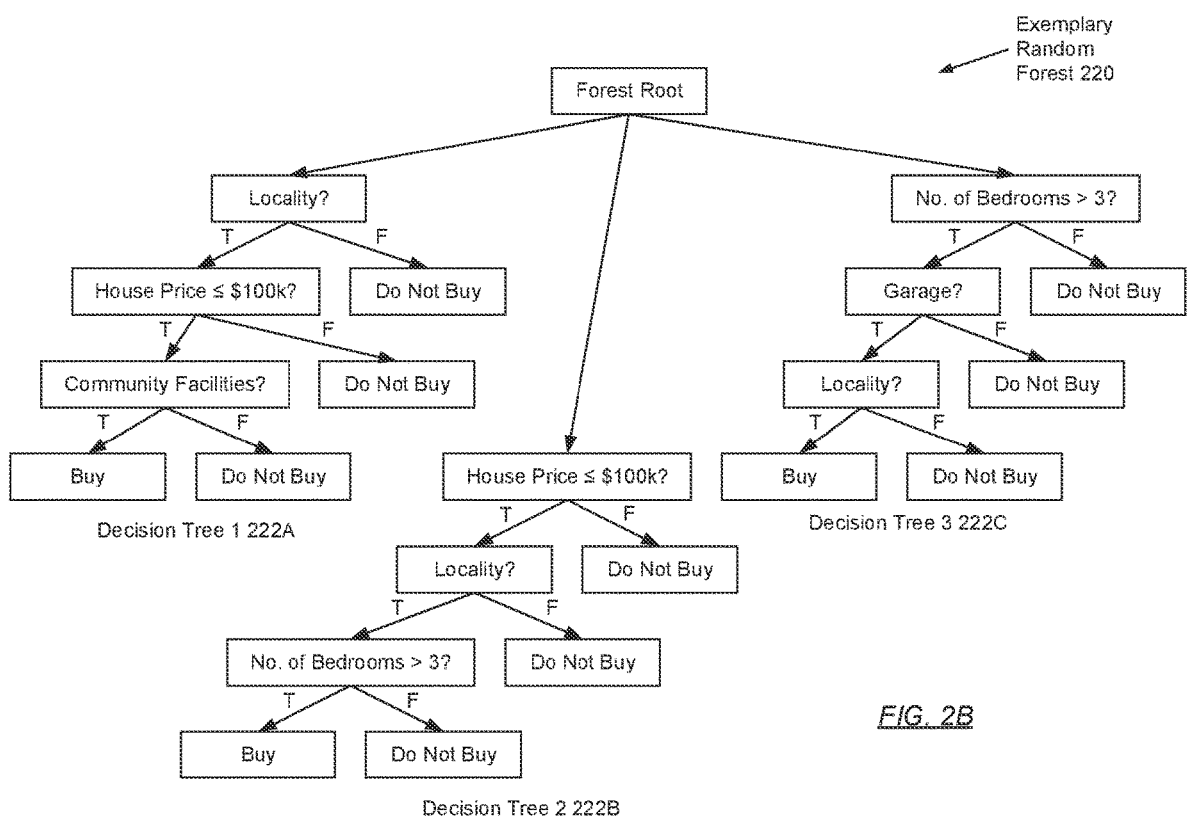
FIG. 2B shows an exemplary random forest model in accordance with one or more embodiments of the invention.

FIG. 2B shows an exemplary random forest model in accordance with one or more embodiments of the invention. The exemplary random forest model (220) is presented for explanatory purposes only and not intended to limit the scope of the invention. That being said, the shown exemplary random forest model (220) may address a classification problem directed to deciding whether a house or property (i.e., an input data sample) (given certain characteristics or features) should be bought (i.e., a first classification output) or not bought (i.e., a second classification output).

In one embodiment of the invention, in order to arrive at an overall classification output, the exemplary random forest model (220) employs an ensemble of three decision trees (222A-222C), which each pose their respective sequence of yes-no (or true-false) questions entailing different features of a candidate house or property. As outlined by the exemplary random forest model (220), a first decision tree (222A) thereof considers a locality feature, a house price feature, and a community facilities feature to arrive at an output; a second decision tree (222B) thereof considers the house price feature, the locality feature, and a number of bedrooms feature to arrive at an output; and a third decision tree (222C) thereof considers the number of bedrooms feature, a garage feature, and the locality feature to arrive at an output.

In one embodiment of the invention, the exemplary random forest (220) exhibits both value associated and valueless associated features, which pertain to the set of nodes throughout the ensemble of decision trees (222A-222C). Examples of features possessing both feature names and feature values include the house price feature (associated with a $100 k feature value) and the number of bedrooms feature (associated with a 3 feature value). On the other hand, examples of features possessing only feature names include the locality feature, the community facilities feature, and the garage feature. Furthermore, between decision trees (222A-222C), the exemplary random forest model (220) exhibits feature subtree repeats (also referred to as feature repeats)—i.e., repeats of: the locality feature (appearing three times), the house price feature (appearing two times), and the number of bedrooms feature (also appearing two times). Though the exemplary random forest model (220) does not exhibit any combination subtree repeats (also referred to as combination repeats), an example thereof would be a hierarchy of nodes rooted with (or having a root node of) the locality feature, followed by a "yes"/"true" or "no"/"false" path leading to the house price feature.

Figure 3A:
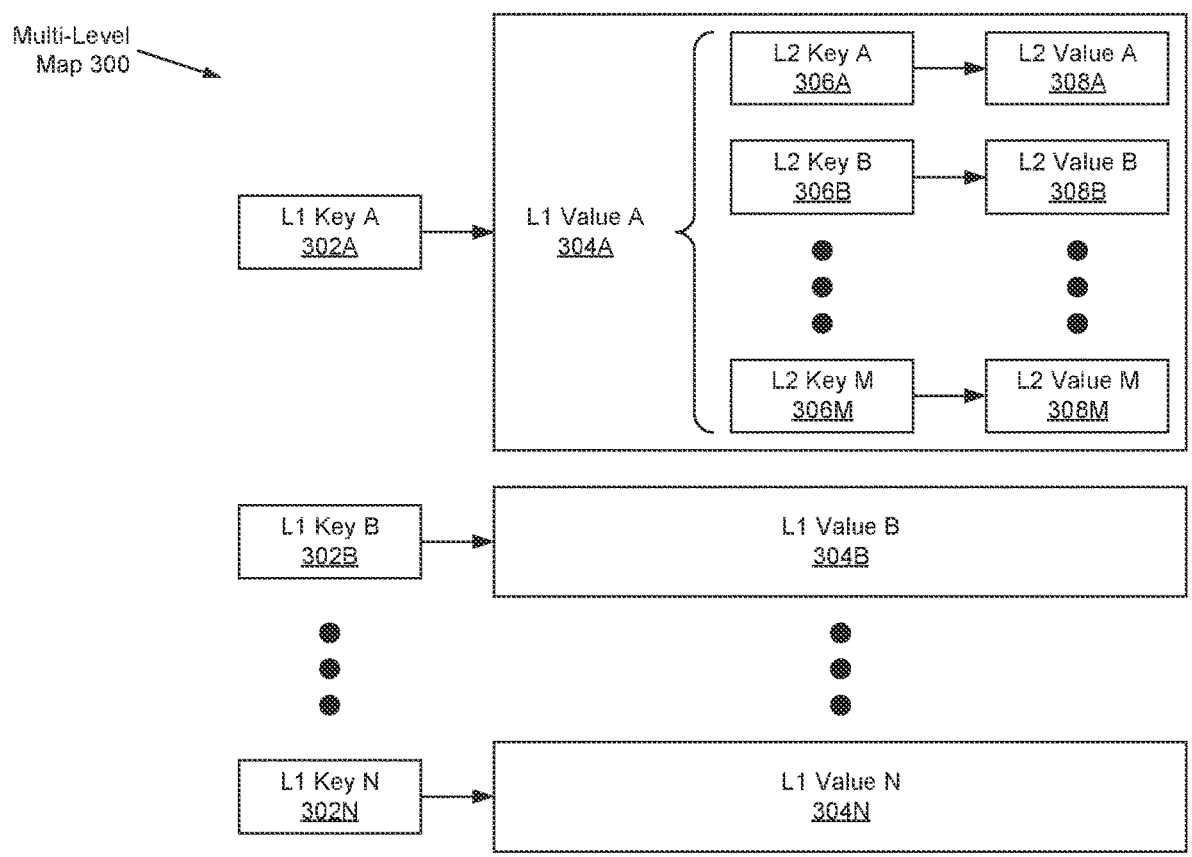
FIG. 3A shows a multi-level map in accordance with one or more embodiments of the invention.

FIG. 3A shows a multi-level map in accordance with one or more embodiments of the invention. Generally, a multi-level map may refer to a nested array, or an array of elements (i.e., a first level array) where each element thereof contains another array of elements (i.e., a second level array). Specifically, the first level array (or outer array) may be defined through a first collection of key-value pairs or mappings. Each of these key-value pairs may represent an element of the first level array, which may include: a level one (L1) key (302A-302N) that maps to a L1 value (304A-304N). In turn, the L1 value (304A-304N) of each first level array element may disclose a second level array (or inner array), which may be defined through a second collection of key-value pairs or mappings. Each of these key-value pairs may represent an element of the second level array, which may include: a level two (L2) key (306A-306M) that maps to a L2 value (308A-308M).

In one embodiment of the invention, two types of multi-level maps may be mentioned hereinafter throughout this disclosure—i.e., a feature multi-level map and a combination multi-level map. A feature multi-level map may refer to a nested array that may be used to track a root height distribution of feature repeats exhibited by a random forest model (see e.g., FIGS. 2A and 2B), whereas a combination multi-level map may refer to a nested array that may be used to track a root height distribution of combination repeats exhibited by the random forest model. Through the tracking of the aforementioned root height distributions of feature and/or combination repeats, information (e.g., which feature or combination of features sway the decision-making process) pertinent to understanding how or why a given random forest model solves (or provides an output) to a classification, regression, or prediction problem may become apparent.

In one embodiment of the invention, within a feature multi-level map, each L1 key (302A-302N) may represent a different (unique) feature employed across a given random forest model. Further, each L2 key (306A-306M) within any L1 value (304A-304N) may represent a different root height (or height of the root of the feature subtree) where the feature subtree root resides. In general, the height (or height level) of a tree data structure (or similarly, the height of the root node of the tree data structure) may refer to the number of edges between the bottommost level of nodes and the root node of the tree data structure. Moreover, within a feature multi-level map, each L2 value (308A-308M), mapped to a given L2 key (306A-306M), may represent a count (or number of times) that the feature subtree root associated with the feature (specified through a given L1 key (302A-302N)) resides at the height level (specified through the given L2 key (302A-302M)).

In one embodiment of the invention, within a combination multi-level map, each L1 key (302A-302N) may represent a different (unique) combination or hierarchy of features employed across a given random forest model. Subsequently, each L2 key (306A-306M) within any L1 value (304A-304N) may represent a different root height (or height of the root of the combination subtree) where the combination subtree resides. Lastly, within a combination multi-level map, each L2 value (308A-308M), mapped to a given L2 key (306A-306M), may represent a count (or number of times) that the combination subtree root associated with the combination (specified through a given L1 key (302A-302N)) resides at the height level (specified through the given L2 key (302A-302M)).

While FIG. 3A shows a configuration of components, other multi-level map (300) configurations may be used without departing from the scope of the invention.

Figure 3B:
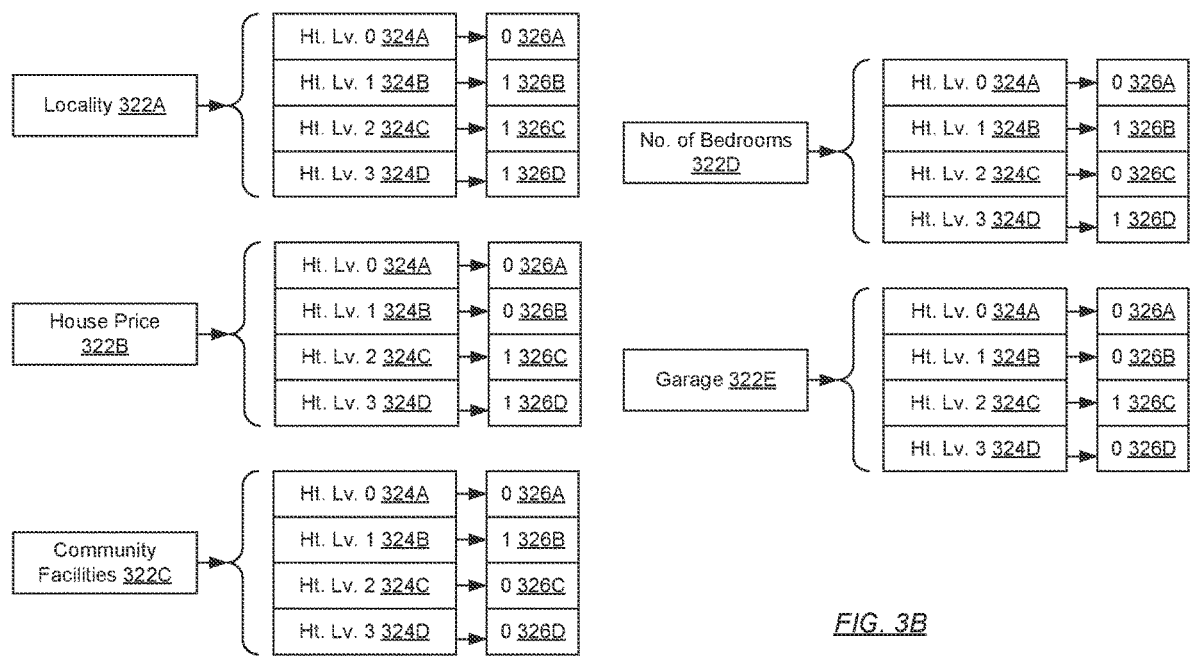
FIG. 3B shows an exemplary feature multi-level map in accordance with one or more embodiments of the invention.

FIG. 3B shows an exemplary feature multi-level map in accordance with one or more embodiments of the invention. The exemplary feature multi-level map (320) is presented for explanatory purposes only and not intended to limit the scope of the invention. That being said, the exemplary feature multi-level map (320) tracks root height distributions of feature repeats occurring throughout the exemplary random forest model shown and described in FIG. 2B, above. As a feature multi-level map, each L1 key (322A-322E) of the exemplary feature multi-level map (320) corresponds to a unique feature—i.e., a locality feature, a house price feature, a community facilities feature, a number of bedrooms feature, and a garage feature—employed across the exemplary random forest model.

From there, each L1 key (322A-322E) maps to a given L1 value represented through a set of L2 key (324A-324D) to L2 value (326A-326D) mappings. Within each set of mappings, each L2 key (324A-324D) corresponds to a different feature subtree root height—i.e., height level 0, height level 1, height level 2, and height level 3—observed across the exemplary random forest model. Further, within each set of mappings, each L2 value (326A-326D) tracks a count (or a number of times) that the feature subtree root for the feature (specified through the given L1 key (322A-322E)) resides at the height level (specified through the given L2 key (324A-324D) mapped to the L2 value (326A-326D).

In traversing, for example, through the nested array element corresponding to the locality feature disclosed within the exemplary random forest model: (a) the L1 key (322A) thereof specifies the locality feature (or feature name thereof); (b) each L2 key (324A-324D) (at least in part representative of the L1 value) specifies one of the four possible height levels where a feature subtree root of the locality feature may reside across the exemplary random forest model; and (c) each L2 value (326A-326D) (at least in part representative of the L1 value) specifies a count (or number of times) that the feature subtree root of the locality feature resides at one of the four possible height levels observed across the exemplary random forest model. In short, the feature subtree root of the locality feature resides: (1) zero times at height level 0 (i.e., bottommost set of nodes within the three decision trees); (2) one time at height level 1 (i.e., set of nodes one level above the bottommost set of nodes); (3) one time at height level 2 (i.e., set of nodes two levels above the bottommost set of nodes); and (4) one time at height level 3 (i.e., set of nodes three levels above the bottommost set of nodes).

Figure 4A:
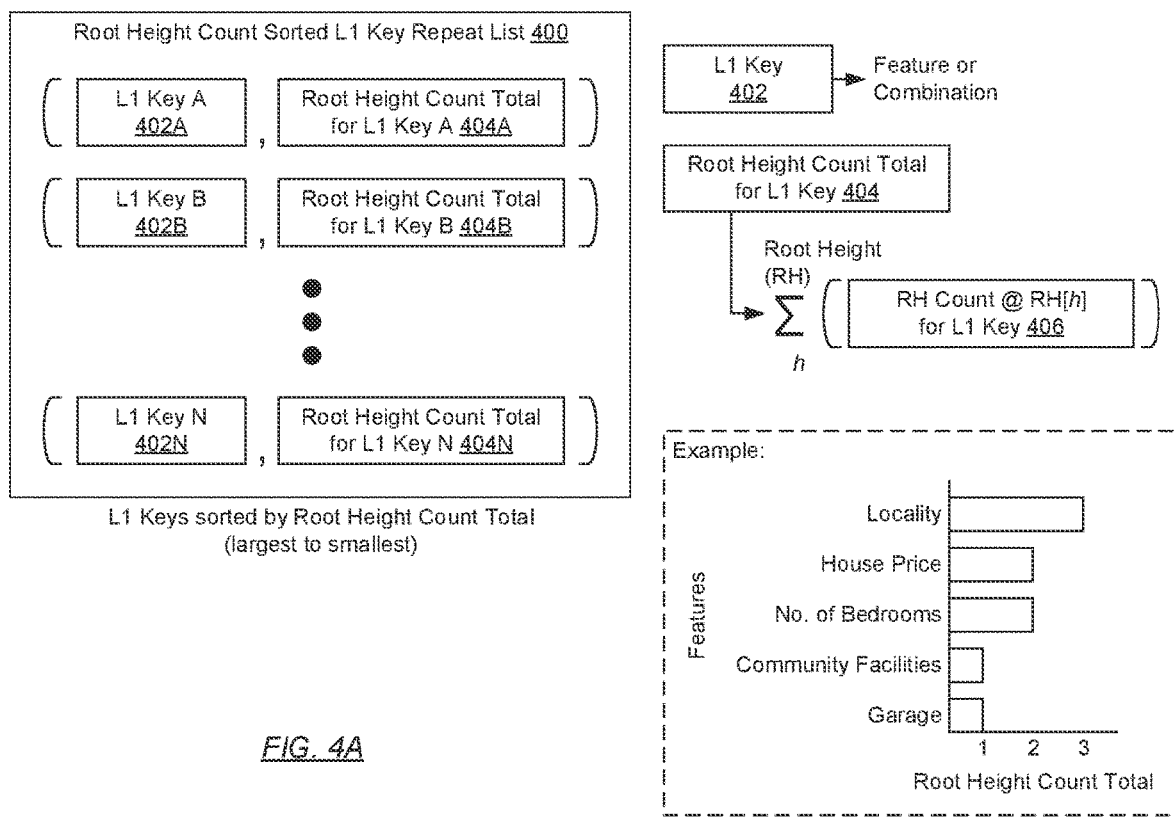
FIG. 4A shows a root height count sorted feature or combination repeat list in accordance with one or more embodiments of the invention.

FIG. 4A shows a root height count sorted feature or combination repeat list in accordance with one or more embodiments of the invention. A root height count sorted L1 key (i.e., feature or combination) repeat list (400) may refer to a data structure that includes a sorted set of two-element tuples. Each two-element tuple may be defined using a given L1 key (402A-402N) that maps to a given root height count total for the given L1 key (404A-404N).

In one embodiment of the invention, each L1 key (402A-402N) associated with a root height count sorted feature repeat list may reference a unique feature, whereas each L1 key (402A-402N) conversely associated with a root height count sorted combination repeat list may reference a unique combination or hierarchy of features, presented throughout a given random forest model. Meanwhile, each root height count total for a given L1 key (404A-404N) associated with a root height count sorted feature repeat list may reference the frequency that a given unique feature, whereas each root height count total for a given L1 key (402A-402N) associated with a root height count sorted combination repeat list may reference the frequency that a given unique combination, appears across the ensemble of decision trees forming a given random forest model. Moreover, in one embodiment of the invention, the sorted set of two-element tuples of a root height count sorted L1 key repeat list (400) may be sorted based on the root height count total for a given L1 key (404A-404N) at least in part defining each two-element tuple, from largest to smallest.

In one embodiment of the invention, any given root height count total for a given L1 key (404A-404N) may be derived through the summation of a set of root height counts (406) for heights at which the given L1 key (402A-402N) (i.e., feature or combination) root resides within a given random forest model (see e.g., L2 values described in FIGS. 3A and 3B, above).

In one embodiment of the invention, any root height count sorted L1 key repeat list (400) may be presented in a graphical format, just as well as in a tabular format. By way of an example, a graphical representation (or histogram) for a root height count sorted feature repeat list is portrayed, which reflects the frequency each unique feature appears throughout the exemplary random forest model shown in FIG. 2B, above. Through examination of the graphical representation, one can deduce that the locality feature appears the most times throughout the exemplary random forest model, and thereby represents the most significant feature therein. In identifying one or more significant features within a given random forest model, model biases may be identified and enacted upon to improve the efficiency and/or accuracy of the given random forest model.

While FIG. 4A shows a configuration of components, other root height count sorted L1 key repeat list (400) configurations may be used without departing from the scope of the invention.

Figure 4B:
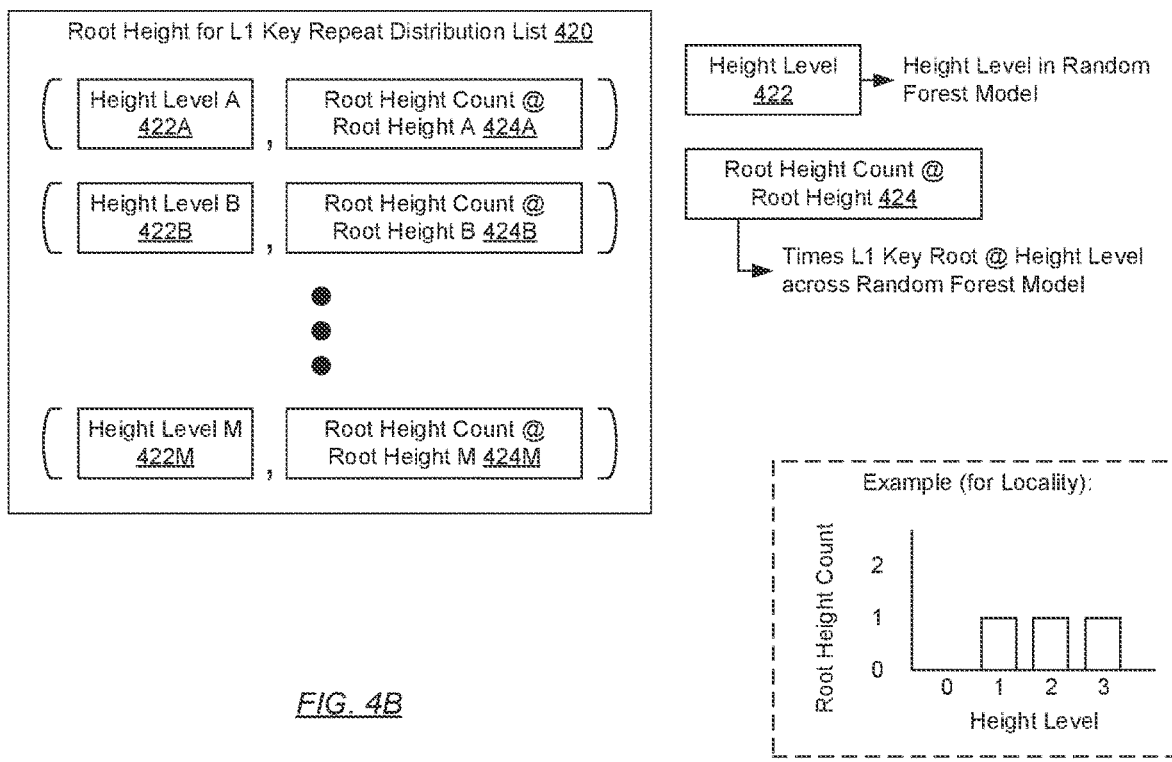
FIG. 4B shows a root height for feature or combination repeat distribution list in accordance with one or more embodiments of the invention.

FIG. 4B shows a root height for feature or combination repeat distribution list in accordance with one or more embodiments of the invention. A root height for L1 key (i.e., feature or combination) repeat distribution list (420) may refer to a data structure that includes a set of two-element tuples. Each two-element tuple may be defined using a given height level (422A-422M) that maps to a given root height count at the given height level (or root height level) (424A-424M).

In one embodiment of the invention, each height level (422A-422M) associated with a root height for feature repeat (or combination) distribution list may reference a different height level of nodes observed across the ensemble of decision trees forming a given random forest model. Meanwhile, each root height count at a given root height level (424A-424M) associated with a root height feature (or combination) repeat list may reference the frequency that the root node of a given unique feature (or unique combination) subtree appears at the given height level (422A-422M) across the ensemble of decision trees forming a given random forest model.

In one embodiment of the invention, any root height for L1 key repeat distribution list (420) may be presented in a graphical format, just as well as in a tabular format. By way of an example, a graphical representation (or histogram) for a root height count for feature (i.e., locality feature) repeat distribution list is portrayed, which reflects the distribution that the root node of the locality feature subtree appears across different height levels throughout the exemplary random forest model shown in FIG. 2B, above.

While FIG. 4B shows a configuration of components, other root height for L1 key repeat distribution list (420) configurations may be used without departing from the scope of the invention.

Figure 5:
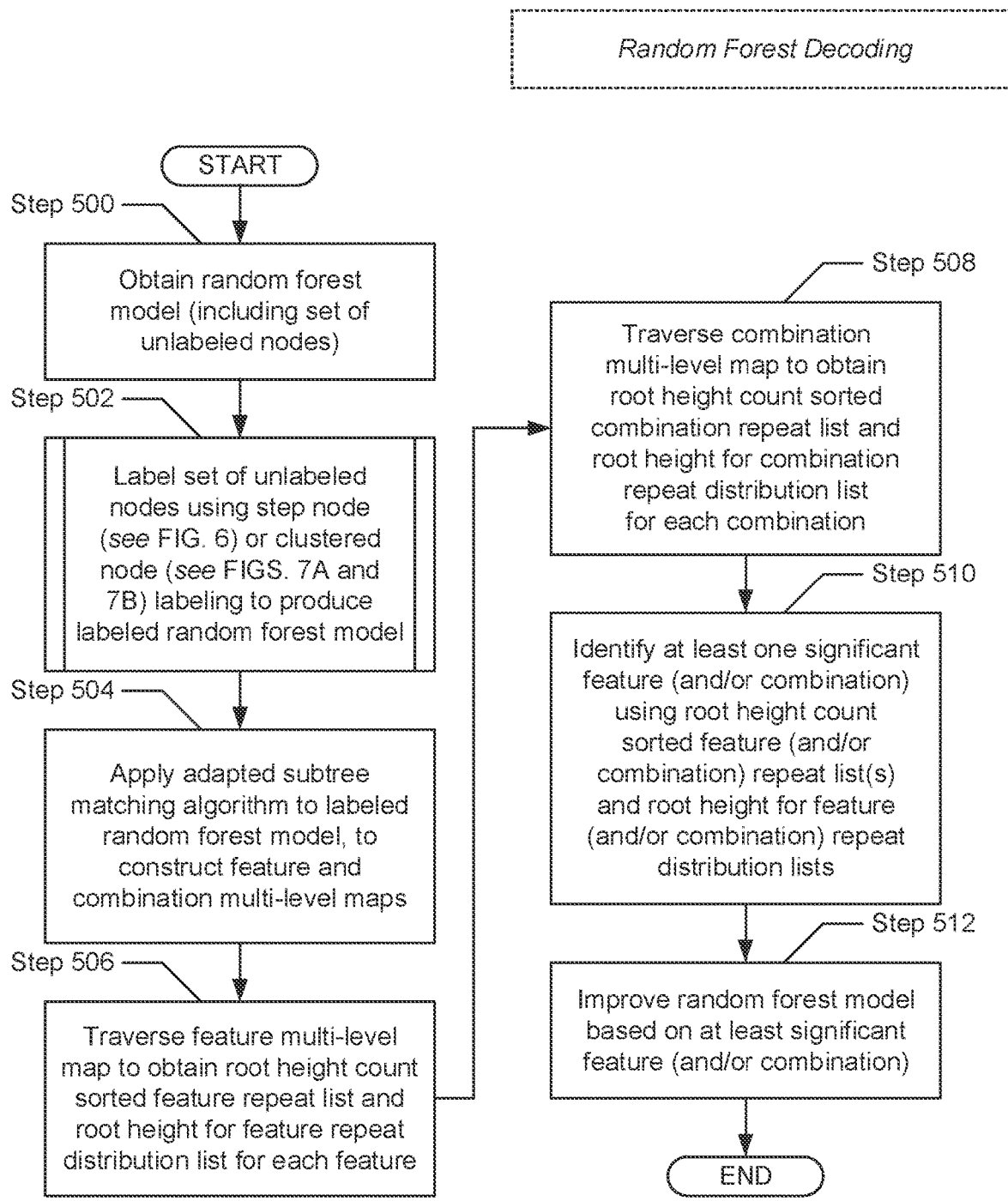
FIG. 5 shows a flowchart describing a method for random forest decoding in accordance with one or more embodiments of the invention.

FIG. 5 shows a flowchart describing a method for random forest decoding in accordance with one or more embodiments of the invention. The various steps outlined below may be performed by the forest decoding service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a random forest model (see e.g., FIGS. 2A and 2B) is obtained. In one embodiment of the invention, the random forest model may refer to an ensemble or collection of decision trees altogether including a set of unlabeled nodes.

In Step 502, the set of unlabeled nodes of the random forest model (obtained in Step 500), are labeled using a tree node labeling algorithm. In one embodiment of the invention, the employed tree node labeling algorithm may encompass step node labeling (mentioned above, see e.g., FIG. 1), which is outlined in further detail in FIG. 6, below. In another embodiment of the invention, the employed tree node labeling algorithm may alternatively encompass clustered node labeling (mentioned above, see e.g., FIG. 1), which is outlined in further detail in FIGS. 7A and 7B, below. Further, following the labeling of the set of unlabeled nodes, a labeled random forest model may be produced.

In Step 504, a pair of multi-level maps (see e.g., FIGS. 3A and 3B) are constructed through traversal of the labeled random forest model (produced in Step 502). In one embodiment of the invention, the pair of multi-level maps may include a feature multi-level map and a combination multi-level map. The former may refer to a nested array that may be used to track a root height distribution of feature repeats, whereas the latter may refer to a nested array that may be used to track a root height distribution of combination repeats, exhibited by the random forest model (obtained in Step 500). Further, construction of the pair of multi-level maps may entail the application of an adapted subtree matching algorithm (mentioned above, see e.g., FIG. 1) onto the labeled random forest model.

In Step 506, the feature multi-level map (constructed in Step 504) is interpreted or traversed to obtain a collection of lists. In one embodiment of the invention, these lists may include: (a) a root height count sorted feature repeat list (see e.g., FIG. 4A); and (b) a sub-collection of lists, including a root height for feature repeat distribution list (see e.g. FIG. 4B) for each unique feature exhibited throughout the random forest model (obtained in Step 500).

In Step 508, the combination multi-level map (constructed in Step 504) is interpreted or traversed to obtain another collection of lists. In one embodiment of the invention, these other lists may include: (a) a root height count sorted combination repeat list (see e.g., FIG. 4A); and (b) a sub-collection of lists, including a root height for combination repeat distribution list (see e.g., FIG. 4B) for each unique combination (or hierarchy of features) exhibited throughout the random forest model (obtained in Step 500).

In Step 510, one or more significant features (and/or combinations) is/are identified. Specifically, in one embodiment of the invention, the significant feature(s) of the random forest model (obtained in Step 500) may be identified using any subset or all of the collection of lists (obtained in Step 506). Similarly, the significant combination(s) of the random forest model may be identified using any subset or all of the other collection of lists (obtained in Step 508). Further, a significant feature (or a significant combination) may refer to a given feature subtree (or a given combination subtree), in a random forest model, which reflects at least a threshold information gain exhibited by any of the feature subtrees (or combination subtrees) in the random forest model. Information gain may refer to a measurement of how much "information" (i.e., sway, influence, or importance) that a given feature (or combination) provides about a given classification or prediction that may be outputted by the random forest model (or any constituent decision tree thereof).

In Step 512, the random forest model (obtained in Step 500) is improved based at least on the significant feature(s) (and/or combination(s)) (identified in Step 510). That is, in one embodiment of the invention, the random forest model may be improved through: (a) the collection of data samples biased to the significant feature(s) (and/or combination(s)); and (b) the optimization of the random forest model using the collected data samples. As the random forest model may represent a machine learning algorithm, optimization (entailing the collected data samples) may include training and/or validating the random forest model through supervised learning. Further, in optimizing the random forest model, a performance (or ability to accurately output a given classification or prediction given a test data sample) of the random forest model may also be improved.

Figure 6:
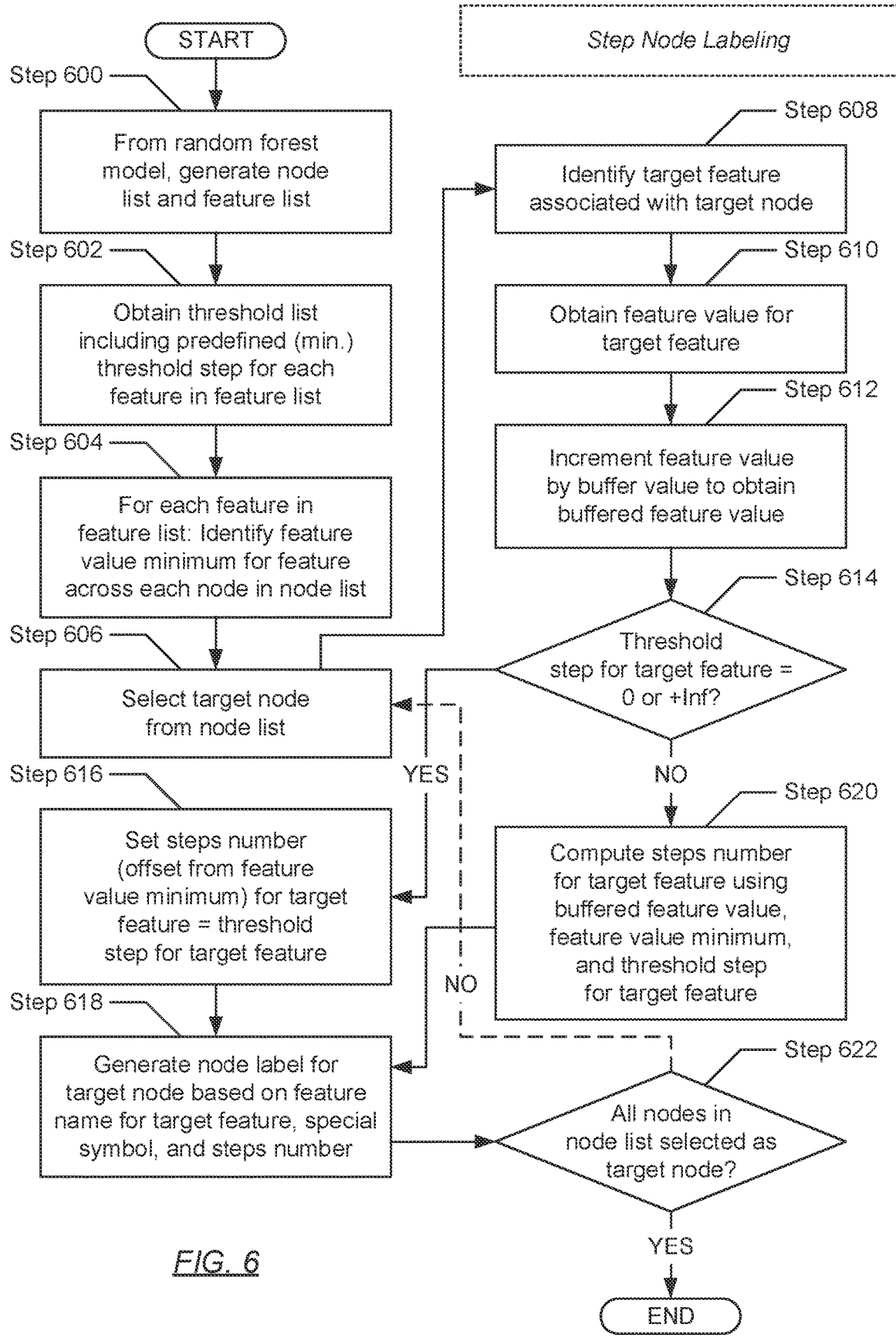
FIG. 6 shows a flowchart describing a method for step node labeling in accordance with one or more embodiments of the invention.

FIG. 6 shows a flowchart describing a method for step node labeling in accordance with one or more embodiments of the invention. The various steps outlined below may be performed by the forest decoding service (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, from a random forest model (see e.g., FIGS. 2A and 2B), a node list and a feature list are generated. In one embodiment of the invention, the node list may refer to a data structure that includes a unique node identifier for each unlabeled node in the random forest model. Accordingly, a cardinality of the node list may equate to the total number of unlabeled nodes found in the random forest model. On the other hand, the feature list may refer to a data structure that includes a two-element tuple for each unique feature disclosed in the random forest model. A cardinality of the feature list, accordingly, may equate to the total number of different (or unique) features found in the random forest model. Further, each two-element tuple in the feature list may include a first element mapped to a second element, where: (a) the first element may present a feature name of a given feature; and (b) the second element may present a feature value (if any) associated with the given feature. Features lacking a corresponding feature value may have an empty second element.

In Step 602, a threshold list is obtained. In one embodiment of the invention, the threshold list may refer to a data structure that includes a predefined threshold step assigned to each feature represented in the feature list (generated in Step 600). A threshold step may refer to a class resolution (or class interval size) for defining any class in a distribution of feature values. In using a threshold step, nodes that are similar, according to the class resolution associated with a given feature, may be aggregated under a common node label—i.e., nodes that are the same number of threshold steps (for a given feature) away from an absolute minimum feature value (for the given feature) may be labeled using the same node label.

In Step 604, for each feature represented in the feature list (generated in Step 600), an absolute minimum feature value (or feature value minimum) for the feature is identified. In one embodiment of the invention, the feature value minimum for a given feature may refer to a lowest value of a set of feature values, exhibited in the random forest model (mentioned in Step 600), for the given feature.

In Step 606, a target node, represented in the node list (generated in Step 600), is selected. In one embodiment of the invention, the target node may be selected according to a sequence in which the set of unique node identifiers may be ordered in the node list.

In Step 608, a target feature, associated with the target node (selected in Step 606), is identified. In one embodiment of the invention, the target feature may reference a given feature mentioned in the yes-no (or true-false) question posed by the target node. Thereafter, in Step 610, a feature value (if any) for the target feature (identified in Step 608) is obtained.

In Step 612, the feature value (if any) (obtained in Step 610) for the target feature (identified in Step 608) is incremented by a predefined buffer value. In one embodiment of the invention, the predefined buffer value may be added to the feature value in order to prevent any nodes, associated with a feature value (for a given feature) equaling the feature value minimum (for the given feature) (identified in Step 604), from being assigned a node label different than any other nodes that may be one threshold step (for the given feature) away from the aforementioned feature value minimum (for the given feature). Further, in incrementing the feature value (if any) for the target feature by the predefined buffer value, a buffered feature value for the target feature is obtained.

In Step 614, a determination is made as to whether the threshold step (obtained in Step 602) for the target feature (identified in Step 608) equals zero or positive infinity (i.e., the latter may be implemented using a very large positive real number). Any given threshold step equaling either of these two aforementioned values may be considered and handled as special cases, which had been predefined by an administrator or user. Accordingly, in one embodiment of the invention, if it is determined that the threshold step for the target feature equals zero or positive infinity, then the process proceeds to Step 616. On the other hand, in another embodiment of the invention, if it is alternatively determined that the threshold step for the target feature does not equal zero or positive infinity, then the process alternatively proceeds to Step 620.

In Step 616, following the determination (in Step 614) that the threshold step (obtained in Step 602) for the target feature (identified in Step 608) equals zero or positive infinity, a steps number variable is created and assigned the value of the aforementioned threshold step for the target feature. In one embodiment of the invention, the steps number variable may refer to a variable that may reflect the number of threshold steps, which the feature value for the target feature, is away from the feature value minimum (identified in Step 604) for the target feature.

In Step 618, a node label, for the target node (selected in Step 606), is generated. In one embodiment of the invention, the node label may be formed through a concatenation of: (a) the feature name associated with the target feature (identified in Step 608); (b) a special character or symbol (e.g., "S"), which may not be found in the feature name associated with any feature represented in the feature list (generated in Step 600); and (c) the steps number (or value assigned to the steps number variable) (created in Step 616 or Step 620). From here, the process proceeds to Step 622 (described below).

In Step 620, following the alternative determination (in Step 614) that the threshold step (obtained in Step 602) for the target feature (identified in Step 608) does not equal zero or positive infinity, a steps number variable is created and assigned a value resulting from a computation involving the buffered feature value (obtained in Step 612), the feature value minimum (identified in Step 604) for the target feature, and the threshold step for the target feature. In one embodiment of the invention, the computation may follow the below mathematical expression:

$$SNV = \operatorname{ceiling}\left(\frac{FV - FVM}{TS}\right)$$

where: SNV is the steps number variable, FV is the feature value for the target feature, FVM is the feature value minimum for the target feature, TS is the threshold step for the target feature, and ceiling( ) refers to a function that returns the smallest integer greater than or equal to the function argument or input. From here, the process proceeds to Step 618 (described above).

In Step 622, a determination is made as to whether all nodes represented in the node list (generated in Step 600) have been selected as the target node. In one embodiment of the invention, if it is determined that at least one node, represented in the node list, has yet to be selected as the target node, then the process proceeds to Step 606, where one node of the at least one node (represented in the node list) is selected. On the other hand, in another embodiment of the invention, if it is alternatively determined that all nodes, represented in the node list, have been selected as the target node, then the process ends. In ending, a node label has been generated and assigned to each node represented in the node list, thereby producing a labeled random forest model for the random forest model (mentioned in Step 600).

Figure 7A:
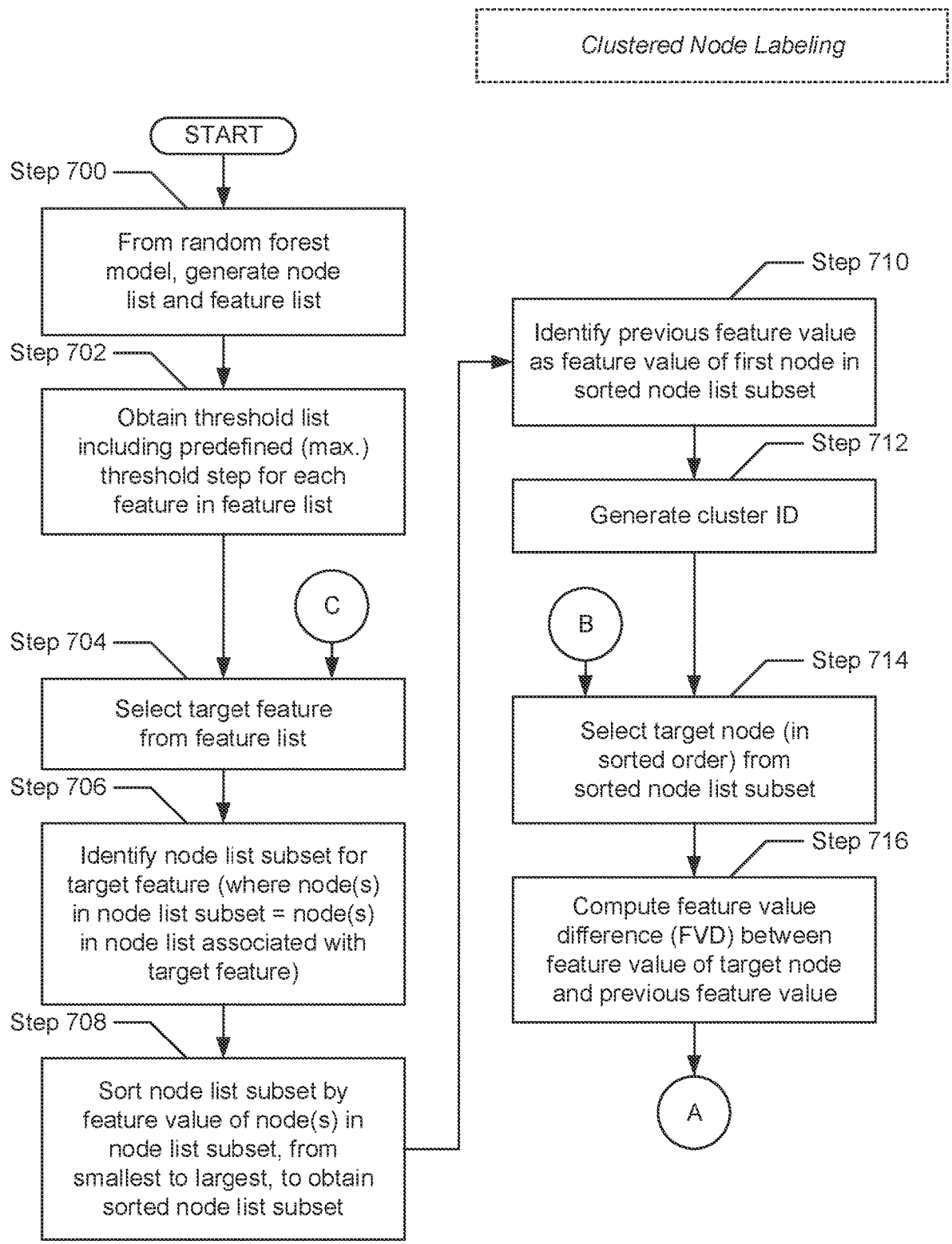
FIGS. 7A and 7B show flowcharts describing a method for clustered node labeling in accordance with one or more embodiments of the invention.
Figure 7B:
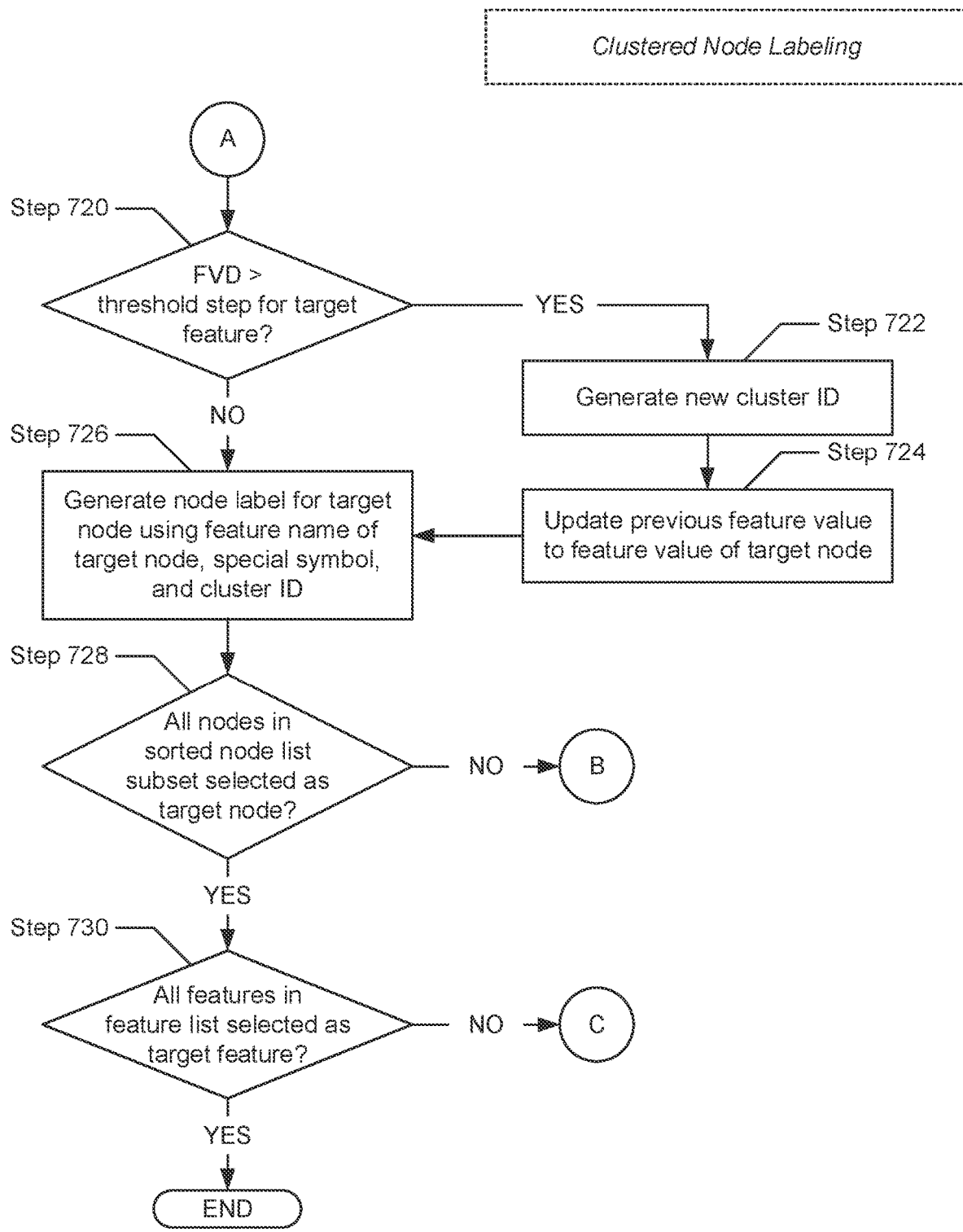

FIGS. 7A and 7B show flowcharts describing a method for clustered node labeling in accordance with one or more embodiments of the invention. The various steps outlined below may be performed by the forest decoding service (see e.g., FIG. 1). Further, while the various steps in the flowcharts are presented and described sequentially, one of ordinary skill will appreciate that some or all steps may be executed in different orders, may be combined or omitted, and some or all steps may be executed in parallel.

Turning to FIG. 7A, in Step 700, from a random forest model (see e.g., FIGS. 2A and 2B), a node list and a feature list are generated. In one embodiment of the invention, the node list may refer to a data structure that includes a unique node identifier for each unlabeled node in the random forest model. Accordingly, a cardinality of the node list may equate to the total number of unlabeled nodes found in the random forest model. On the other hand, the feature list may refer to a data structure that includes a two-element tuple for each unique feature disclosed in the random forest model. A cardinality of the feature list, accordingly, may equate to the total number of different (or unique) features found in the random forest model. Further, each two-element tuple in the feature list may include a first element mapped to a second element, where: (a) the first element may present a feature name of a given feature; and (b) the second element may present a feature value (if any) associated with the given feature. Features lacking a corresponding feature value may have an empty second element.

In Step 702, a threshold list is obtained. In one embodiment of the invention, the threshold list may refer to a data structure that includes a predefined maximum threshold step assigned to each feature represented in the feature list (generated in Step 700). A maximum threshold step may refer to a maximum allowed distance (or difference) between a cluster feature value representative of a cluster of nodes and a feature value for a feature posed by any given node in the random forest model. In using a maximum threshold step, nodes that are similar, according to the cluster to which the nodes may be assigned, may be labeled using a common node label.

In Step 704, a target feature, represented in the feature list (generated in Step 700), is selected. In one embodiment of the invention, the target feature may be selected according to a sequence in which the set of features may be ordered in the feature list.

In Step 706, a node list subset, for the target feature (selected in Step 704), is identified. In one embodiment of the invention, the node list subset may include one or more nodes, represented in the node list (generated in Step 700), which mentions the target feature in the yes-no (or true-false) question posed by the node(s).

In Step 708, the node list subset (identified in Step 706), for the target feature (selected in Step 704), is sorted. Specifically, in one embodiment of the invention, the node (s) represented in the node list subset may be sorted based on the feature value associated with the node(s), from smallest to largest (or ascending order). Further, in sorting the node list subset, a sorted node list subset for the target feature is obtained.

In Step 710, a previous feature value (also referred to above as a cluster feature value associated with a given cluster) is identified. Specifically, in one embodiment of the invention, the previous feature value may reflect a feature value representative of a current cluster to which one or more nodes, of the random forest model, may be assigned. The previous feature value, at this point, may be initialized to the feature value associated with the first node represented in the sorted node list subset (obtained in Step 708). Thereafter, in Step 712, a cluster identifier is generated. In one embodiment of the invention, generation of the cluster identifier may be synonymous with the creation of a given cluster with which the cluster identifier may be associated, where the given cluster may represent a cluster to which one or more nodes, of the random forest model, may be assigned.

In Step 714, a target node, represented in the sorted node list subset (obtained in Step 708), is selected. In one embodiment of the invention, the target node may be selected according to a sequence in which the subset of nodes may be ordered in the sorted node list subset.

In Step 716, a feature value difference is computed. In one embodiment of the invention, the feature value difference may reference the difference in value between the feature value (if any) associated with the target node (selected in Step 714) and the previous feature value (identified in Step 710). From here, the process proceeds to Step 720 (see e.g., FIG. 7B).

Turning to FIG. 7B, in Step 720, a determination is made as to whether the feature value difference (computed in Step 716) exceeds the maximum threshold step (obtained in Step 702) for the target feature (selected in Step 704). In one embodiment of the invention, if it is determined that the feature value difference is greater than the maximum threshold step for the target feature, then the process proceeds to Step 722. On the other hand, in another embodiment of the invention, if it is alternatively determined that the feature value difference is less than or equal to the maximum threshold step for the target feature, then the process alternatively proceeds to Step 726.

In Step 722, following the determination (in Step 720) that the feature value difference (computed in Step 716) exceeds the maximum threshold step (obtained in Step 702) for the target feature (selected in Step 704), a new cluster identifier is generated. In one embodiment of the invention, generation of the new cluster identifier may be synonymous with the creation of a new given cluster with which the new cluster identifier may be associated, where the new given cluster may represent another cluster to which one or more nodes, of the random forest model, may be assigned.

In Step 724, the previous feature value (identified in Step 710) is updated to the feature value (if any) associated with the target node (selected in Step 714). In one embodiment of the invention, this updated previous feature value may subsequently reflect a feature value representative of the new given cluster (created in Step 722).

In Step 726, following Step 724 or the alternative determination (in Step 720) that the feature value difference (computed in Step 716) fails to exceed the maximum threshold step (obtained in Step 702) for the target feature (selected in Step 704), a node label, for the target node (selected in Step 714), is generated. In one embodiment of the invention, the node label may be formed through a concatenation of: (a) the feature name associated with the target feature; (b) a special character or symbol (e.g., "$"), which may not be found in the feature name associated with any feature represented in the feature list (generated in Step 700); and (c) the cluster identifier or new cluster identifier (generated in Step 712 or Step 722).

In Step 728, a determination is made as to whether all nodes represented in the sorted node list subset (obtained in Step 708) have been selected as the target node. In one embodiment of the invention, if it is determined that at least one node, represented in the sorted node list subset, has yet to be selected as the target node, then the process proceeds to Step 714, where one node of the at least one node (represented in the sorted node list subset) is selected. On the other hand, in another embodiment of the invention, if it is alternatively determined that all nodes, represented in the sorted node list subset, have been selected as the target node, then the process alternatively proceeds to Step 730.

In Step 730, following the determination (in Step 728) that all nodes represented in the sorted node list subset (obtained in Step 708) have been selected as the target node, another determination is made as to whether all features represented in the feature list (generated in Step 700) have been selected as the target feature. In one embodiment of the invention, if it is determined that at least one feature, represented in the feature list, has yet to be selected as the target feature, then the process proceeds to Step 704, where one feature of the at least one feature (represented in the feature list) is selected. On the other hand, in another embodiment of the invention, if it is alternatively determined that all features, represented in the feature list, have been selected as the target feature, then the process ends. In ending, a node label has been generated and assigned to each node represented in the node list (generated in Step 700), thereby producing a labeled random forest model for the random forest model.

Figure 8:
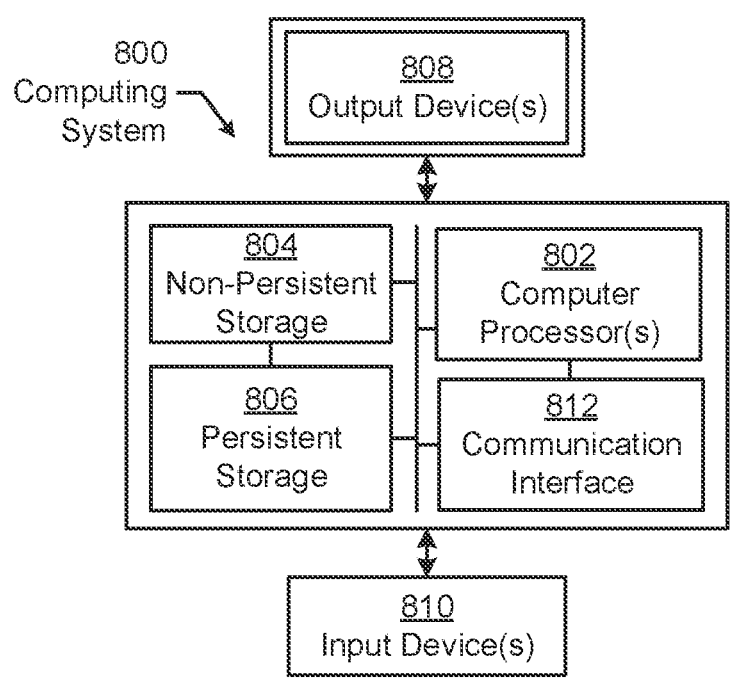
FIG. 8 shows an exemplary computing system in accordance with one or more embodiments of the invention.

FIG. 8 shows an exemplary computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disc (CD) drive or digital versatile disk (DVD) drive, a flash memory, etc.), a communication interface (812) (e.g., Bluetooth® interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a central processing unit (CPU) and/or a graphics processing unit (GPU). The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for decoding random forest models, comprising:

obtaining a random forest model comprising a set of unlabeled nodes, wherein the random forest model is a machine learning algorithm;

labeling the set of unlabeled nodes using a tree node labeling algorithm, to produce a labeled random forest model, wherein the tree node labeling algorithm utilizes step node labeling, wherein the step node labeling generates labels for the set of unlabeled nodes based on threshold steps for features presented in the random forest model, wherein the threshold steps refer to a class interval size in a distribution of feature values based on the random forest model;

applying, to the labeled random forest model, an adapted subtree matching algorithm to construct a feature multi-level map, wherein the adapted subtree matching algorithm is a subtree matching algorithm that has been adapted, wherein the feature multi-level map is a first nested array, wherein the first nested array is utilized to track a root height distribution of feature repeats in the labeled random forest model;

traversing the feature multi-level map to obtain a sorted feature repeat list and a set of root heights for feature repeat distribution lists, wherein the sorted feature repeat list reflects a first frequency that a unique feature appears in the random forest model wherein the feature repeat distribution list is a first distribution list for the unique feature in the random forest model;

identifying a significant feature of the random forest model using at least one of a group consisting of the sorted feature repeat list and the set of root height for feature repeats distribution lists;

improving the random forest model at least based on the significant feature, wherein improving comprises:

collecting a set of data samples biased to the significant feature; and optimizing, thereby improving a performance of, the random forest model using the set of data samples, wherein optimizing includes validating the random forest model through supervised learning.

2. The method of claim 1, wherein the tree node labeling algorithm utilizes clustered node labeling.

3. The method of claim 2, wherein clustered node labeling generates labels for the set of unlabeled nodes based on maximum threshold steps for node clusters presented in the random forest model, wherein the maximum threshold steps refer to a maximum distance between a cluster feature value and the feature value.

4. The method of claim 1, wherein the adapted subtree matching algorithm identifies a set of subtrees in the labeled random forest model, wherein the set of subtrees comprises a subset of subtrees used in constructing the feature multi-level map, wherein each subtree of the subset of subtrees is a feature subtree, wherein the feature subtree consists of a single node.

5. The method of claim 1, wherein applying the adapted subtree matching algorithm further constructs a combination multi-level map, wherein the combination multi-level map is a second nested array, wherein the second nested array is utilized to track a root height distribution of combination repeats in the labeled random forest model.

6. The method of claim 5, wherein the adapted subtree matching algorithm identifies a set of subtrees in the labeled random forest model, wherein the set of subtrees comprises a subset of subtrees used in constructing the combination multi-level map, wherein each subtree of the subset of subtrees is a combination subtree, wherein the combination subtree comprises at least two nodes.

7. The method of claim 5, further comprising:
prior to improving the random forest model:
traversing the combination multi-level map to obtain a sorted combination repeat list and a set of root height for combination repeat distribution lists, wherein the sorted combination repeat list reflects a second frequency that a unique combination of features appears in the random forest model, wherein the combination repeat distribution list is a second distribution list for the unique combination of features in the random forest model; and
identifying a significant combination of the random forest model using at least one of a group consisting of the sorted combination repeat list and the set of root height for combination repeat distribution lists,
wherein the random forest model is further improved based on the significant combination.

8. A non-transitory computer readable medium (CRM) comprising computer readable program code, which when executed by a computer processor, enables the computer processor to:
obtain a random forest model comprising a set of unlabeled nodes, wherein the random forest model is a machine learning algorithm;
label the set of unlabeled nodes using a tree node labeling algorithm, to produce a labeled random forest model, wherein the tree node labeling algorithm utilizes step node labeling, wherein the step node labeling generates labels for the set of unlabeled nodes based on threshold steps for features presented in the random forest model, wherein the threshold steps refer to a class interval size in a distribution of feature values based on the random forest model;

apply, to the labeled random forest model, an adapted subtree matching algorithm to construct a feature multi-level map, wherein the adapted subtree matching algorithm is a subtree matching algorithm that has been adapted, wherein the feature multi-level map is a first nested array, wherein the first nested array is utilized to track a root height distribution of feature repeats in the labeled random forest model;

traverse the feature multi-level map to obtain a sorted feature repeat list and a set of root heights for feature repeat distribution lists, wherein the sorted feature repeat list reflects a first frequency that a unique feature appears in the random forest model, wherein the feature repeat distribution list is a first distribution list for the unique feature in the random forest model;

identify a significant feature of the random forest model using at least one of a group consisting of the sorted feature repeat list and the set of root height for feature repeats distribution lists;

improve the random forest model at least based on the significant feature, wherein improving comprises:
collecting a set of data samples biased to the significant feature; and
optimizing, thereby improving a performance of, the random forest model using the set of data samples, wherein optimizing includes validating the random forest model through supervised learning.

9. The non-transitory CRM of claim 8, wherein the tree node labeling algorithm utilizes clustered node labeling.

10. The non-transitory CRM of claim 9, wherein clustered node labeling generates labels for the set of unlabeled nodes based on maximum threshold steps for node clusters presented in the random forest model, wherein the maximum threshold steps refer to a maximum distance between a cluster feature value and the feature value.

11. The non-transitory CRM of claim 8, wherein the adapted subtree matching algorithm identifies a set of subtrees in the labeled random forest model, wherein the set of subtrees comprises a subset of subtrees used in constructing the feature multi-level map, wherein each subtree of the subset of subtrees is a feature subtree, wherein the feature subtree consists of a single node.

12. The non-transitory CRM of claim 8, wherein applying the adapted subtree matching algorithm further constructs a combination multi-level map, wherein the combination multi-level map is a second nested array, wherein the second nested array is utilized to track a root height distribution of combination repeats in the labeled random forest model.

13. The non-transitory CRM of claim 12, wherein the adapted subtree matching algorithm identifies a set of subtrees in the labeled random forest model, wherein the set of subtrees comprises a subset of subtrees used in constructing the combination multi-level map, wherein each subtree of the subset of subtrees is a combination subtree, wherein the combination subtree comprises at least two nodes.

14. The non-transitory CRM of claim 12, further comprising computer readable program code, which when executed by the computer processor, further enables the computer processor to:
prior to improving the random forest model:
traverse the combination multi-level map to obtain a sorted combination repeat list and a set of root height for combination repeat distribution lists, wherein the sorted combination repeat list reflects a second frequency that a unique combination of features appears in the random forest model, wherein the combination repeat distribution list is a second distribution list for the unique combination of features in the random forest model; and identify a significant combination of the random forest model using at least one of a group consisting of the sorted combination repeat list and the set of root height for combination repeat distribution lists, wherein the random forest model is further improved based on the significant combination.

* * * * *